US011151034B2

(12) United States Patent
García Guirado et al.

(10) Patent No.: US 11,151,034 B2
(45) Date of Patent: Oct. 19, 2021

(54) CACHE STORAGE METHOD AND SYSTEM CONFIGURED TO STORE SHAREABLE TAG PORTION AND INDIVIDUAL TAG PORTION

(71) Applicant: Arm Limited, Cambridge (GB)

(72) Inventors: Antonio García Guirado, Trondheim (NO); Andreas Due Engh-Halstvedt, Trondheim (NO)

(73) Assignee: Arm Limited, Cambridge (GB)

( * ) Notice: Subject to any disclaimer, the term of this patent is extended or adjusted under 35 U.S.C. 154(b) by 14 days.

(21) Appl. No.: 16/129,560

(22) Filed: Sep. 12, 2018

(65) Prior Publication Data

US 2019/0079867 A1 Mar. 14, 2019

(30) Foreign Application Priority Data

Sep. 13, 2017 (GB) ..................... 1714758

(51) Int. Cl.
*G06F 12/08* (2016.01)
*G06F 12/0811* (2016.01)
*G06F 12/128* (2016.01)
*G06F 12/0895* (2016.01)

(52) U.S. Cl.
CPC ...... *G06F 12/0811* (2013.01); *G06F 12/0895* (2013.01); *G06F 12/128* (2013.01); *G06F 2212/1044* (2013.01)

(58) Field of Classification Search
None
See application file for complete search history.

(56) References Cited

U.S. PATENT DOCUMENTS

| 5,325,504 | A | 6/1994 | Tipley et al. |
| 6,092,159 | A | 7/2000 | Ekner et al. |
| 6,122,709 | A * | 9/2000 | Wicki ................. G06F 12/1054 711/118 |
| 6,405,287 | B1 | 6/2002 | Lesartre |
| 2006/0294325 | A1* | 12/2006 | Akiyama ............... G09G 5/393 711/154 |
| 2007/0013704 | A1* | 1/2007 | MacWilliams ..... G06F 13/1684 345/542 |
| 2010/0088457 | A1* | 4/2010 | Goodrich ............ G06F 12/0895 711/3 |
| 2012/0054443 | A1* | 3/2012 | Nakra ................. G06F 12/0864 711/128 |

(Continued)

FOREIGN PATENT DOCUMENTS

| GB | 2546245 A | 7/2017 |
| JP | 2003316648 A | 11/2003 |
| WO | 9932980 A1 | 7/1999 |

OTHER PUBLICATIONS

Combined Search and Examination Report dated Feb. 26, 2018 for Application No. GB1714757.0.

(Continued)

*Primary Examiner* — Tracy C Chan
(74) *Attorney, Agent, or Firm* — EIP US LLP

(57) ABSTRACT

Cache storage comprising cache lines, each configured to store respective data entries. The cache storage is configured to store a tag in the form of: an individual tag portion which is individual to a cache line; a shareable tag portion which is shareable between cache lines; and pointer data which associates an individual tag portion with a shareable tag portion.

16 Claims, 5 Drawing Sheets

(56) References Cited

U.S. PATENT DOCUMENTS

| | | | |
|---|---|---|---|
| 2014/0181387 A1* | 6/2014 | Poremba | G06F 12/0886 |
| | | | 711/105 |
| 2014/0189243 A1* | 7/2014 | Cuesta | G06F 12/0864 |
| | | | 711/128 |
| 2015/0012719 A1 | 1/2015 | Tune | |
| 2015/0278096 A1 | 10/2015 | Rolan et al. | |
| 2017/0192900 A1* | 7/2017 | Persson | G06F 12/0846 |
| 2017/0300558 A1* | 10/2017 | Damodaran | G06F 16/332 |

OTHER PUBLICATIONS

Combined Search and Examination Report dated Feb. 27, 2018 for Application No. GB1714758.8.

* cited by examiner

CACHE STORAGE METHOD AND SYSTEM CONFIGURED TO STORE SHAREABLE TAG PORTION AND INDIVIDUAL TAG PORTION

CROSS-REFERENCE TO RELATED APPLICATIONS

This application claims the benefit under 35 U.S.C. § 119(a) and 37 CFR § 1.55 to United Kingdom patent application no. GB1714758.8, filed on Sep. 13, 2017, the entire content of which is incorporated herein by reference.

BACKGROUND OF THE INVENTION

Field of the Invention

The present disclosure relates to cache storage and methods of operating cache storage in data processing systems.

Description of the Related Technology

Data processing systems with cache storage are known. Cache storage can provide faster and more efficient access to frequently used data stored therein, compared to accessing the same data stored in a main storage of the data processing system.

Cache storage typically has limited size compared to the main storage and accordingly only a subset of the data held within the main storage are also stored within the cache storage at any given time.

It is desirable to provide cache storage that makes more efficient usage of its available storage space.

SUMMARY

In a first embodiment, there is provided cache storage comprising cache lines, each configured to store respective data entries representing data which can be retrieved from the cache storage when a storage access instruction contains a storage identifier which corresponds with a tag associated with a cache line, wherein the cache storage is configured to store a said tag in the form of: an individual tag portion which is individual to a cache line; a shareable tag portion which is shareable between cache lines; and pointer data which associates an individual tag portion with a said shareable tag portion.

In some examples, a said tag comprises a plurality of different data types, and said data types are mapped to a said shareable tag portion and a said individual tag portion using at least one mapping schema which distributes the different data types between the shareable tag portion and the individual tag portion. A given data type may be distributed to both the shareable tag portion and the individual tag portion, for example. In some cases, one or more bits of the given data type that are most significant are distributed to the shareable tag portion. In some examples, a specific data type may be distributed only to the shareable tag portion.

In some examples, said data types are mapped to the shareable tag portion and the individual tag portion using a plurality of mapping schemas. The plurality of mapping schemas may include: a first mapping schema, wherein a given data type is distributed only to the shareable tag portion; and a second mapping schema, wherein said given data type is distributed to both the shareable tag portion and the individual tag portion. The individual tag portion may comprise a format indicator which indicates the mapping schema used.

In some cases, the cache storage is configured to, when checking the cache storage in response to a storage access instruction, selectively ignore a discrepancy with regard to a data type stored in the shareable tag portion, based on the format indicator.

In some examples, the cache storage comprises a texture cache for a graphics processing system, wherein: the cache lines comprise texture data representative of one or more texels in a texture space; said given data type corresponds to at least part of a third-dimensional coordinate of the texel in the texture space; and the first mapping schema corresponds to the texture space having two dimensions. The second mapping schema may correspond to the texture space having at least three dimensions.

In some cases, the cache storage is configured to store the pointer data as part of the individual tag portion.

The cache storage may comprise a multi-level cache storage including a first level cache and a second level cache, wherein one of the first level cache and the second level cache is configured to store the cache lines, and the other of the first level cache and the second level cache is configured to store the shareable tag portion.

In a second embodiment, there is provided a data processing system comprising a processor, a main storage, and a cache storage comprising cache lines, each cache line configured to store respective data entries representing data which can be retrieved from the cache storage when a storage access instruction contains a storage identifier which corresponds with a tag associated with a cache line, wherein the cache storage is configured to store a said tag in the form of:
  an individual tag portion which is individual to a cache line;
  a shareable tag portion which is shareable between cache lines; and
  pointer data which associates an individual tag portion with a said shareable tag portion.

In a third embodiment, there is provided a method of operating cache storage comprising cache lines, each configured to store respective data entries representing data which can be retrieved from the cache storage when a storage access instruction contains a storage identifier which corresponds with a tag associated with a cache line, the method comprising: storing a said tag in the cache storage, the tag in the form of:
  an individual tag portion which is individual to a cache line; and
  a shareable tag portion which is shareable between cache lines; and storing pointer data in the cache storage, wherein the pointer data associates a said individual tag portion with a said shareable tag portion.

Further features and advantages of the apparatuses and methods will become apparent from the following description of embodiments, given by way of example only, which is made with reference to the accompanying drawings.

DETAILED DESCRIPTION OF CERTAIN INVENTIVE EMBODIMENTS

In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Figure 1:
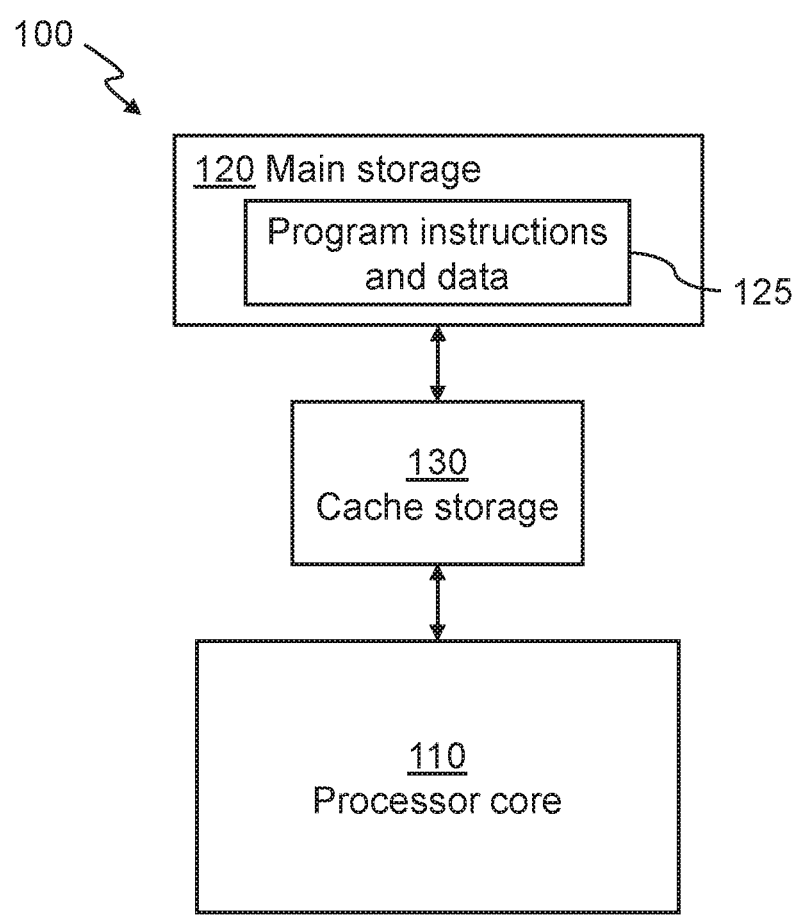
FIG. 1 shows a schematic representation of a computer system including cache storage according to an example.

FIG. 1 schematically illustrates a known data processing apparatus 100 comprising a processor 110, main storage 120, and cache storage 130. The cache storage 130 is disposed between the processor 110 and main storage 120 and may serve to store, or cache, a subset of data 125 stored in the main storage 120. The processor 110 may be a processor core capable of reading and executing program instructions. Compared to the main storage 120, the cache storage 130 may be a smaller, faster storage and may provide quicker and/or more efficient access, for example using less energy, to any data cached in the cache storage 130 compared to accessing the data from the main storage 120.

The cache storage 130 may be an instruction cache configured to store executable instructions fetched from main storage 120, a data cache to store data fetched from main storage 120, a cache able to do both of these functions, or a translation lookaside buffer (TLB) as part of a storage management unit (MMU). The term "data" is used herein to generally include any type of data that the particular cache storage 130 is configured to store, for example executable instructions for an instruction cache, or virtual-to-physical address translations for a TLB.

The cache storage 130 is divided into multiple blocks, termed "cache lines" or "cache blocks". The cache lines may be indexed in the cache storage 130, and comprise storage space for storing data transferred or copied from the main storage 120.

Each cache line is associated with a tag for matching a storage identifier (for example a storage address) representing a location in a storage (e.g. the main storage 120) to that particular cache line. The tags may be stored with, or comprised as part of, the cache lines, or may be stored separately to the cache lines, for example in a tag storage which may be comprised in the cache storage 130 or in a physically separate and discrete storage.

In alternative nomenclature, data transferred between the main storage 120 and the cache storage 130 (e.g. in a block of fixed size) may be called a cache line or cache block, and the cache storage 130 may store "cache entries", where each cache entry includes the copied data (cache line) and a tag.

The processor 110, before reading or writing a location in the main storage 120, for example as part of a storage access instruction (such as a memory access request) may first check the cache storage 130 for the contents (i.e. data) corresponding to the main storage location.

A "cache hit" may occur if the data is found in the cache storage 120, and a "cache miss" may occur if it is not. In the case of a cache hit, the data may be read directly from the cache storage 130.

In the case of a cache miss, the data may be read from the main storage 120 at a cost to speed and efficiency, and may also be stored in the cache storage 130 for subsequent quicker access. The cache storage 130, in examples where it is (set-) associative, e.g. not directly mapped, can be provided with a replacement policy to determine which cache line (which may already contain data) should be removed from the cache storage 130 in order to make space for new data to be fetched from the main storage and stored within the cache storage. There are many known examples of cache replacement policies, such as least recently used, round robin and (pseudo-) random search.

The cache storage 130 may comprise a cache controller, for example cache control circuitry. The cache controller may receive storage access instructions from the processor 110, and may process these instructions to search the cache storage 130 for data. The cache controller may also retrieve stored data in the case of a cache hit, and transfer said data to the processor 110. In the case of a cache miss, the cache controller may submit a further storage access instruction to the main storage 120 to retrieve said data and transfer it to the processor 110.

As described, a tag of the cache storage 130 may be used to map a storage location of the main storage 120 to a cache line where the data stored at said storage location of the main storage 120 has been (or is to be) copied and stored in the cache storage 130.

For example, the main storage 120 may comprise storage locations, each represented by m-bit storage identifiers. In a direct mapped cache storage 130, the least significant k bits of said storage identifier (for example a storage address) may correspond to an index of the cache storage 130, where each index corresponds to a particular cache line. The remaining (m-k) bits of the address may correspond to a tag. Therefore, a concatenation of the index and the tag for a given cache line may correspond to a particular storage identifier representing a storage location in the main storage 120.

When checking the cache storage 130 for given data, e.g. as part of a storage access instruction, the least significant k bits of the storage identifier may be mapped to an index of the cache storage 130. The remaining (m-k) bits of the identifier may be compared to the tag of the cache line at the mapped index of the cache storage 130. If the tag matches, and the cache line is valid (i.e. comprises stored data, which may be indicated by a flag value) then the given data may be read from the cache storage 130.

In some cache storage 130 examples, known as "set associative caches", cache lines are grouped into sets, with each set comprising multiple cache lines. The position of a cache line within a set may be a result of a replacement policy upon allocation of the cache line, as described further below. When a given set in the cache storage is searched for a specific storage identifier (e.g. memory address), for example in response to a storage access instruction, each tag associated with a cache line in the given set may be checked. For example, the storage identifier comprised as part of the storage access instruction may not specify the position of a given cache line within a set, as it may not be known which cache line position in a set will result in a cache hit a priori.

In examples, the least significant bits of the m bits of said storage identifier may correspond an "offset" or "displacement". The offset may denote a particular data element, for example a byte, comprised within the data of a particular cache line. For example, if a given cache line contains 64 data elements, the offset may be 6 bits and indicate which of the 64 data elements is of interest. This can apply whether the cache storage is (set-)associative or direct mapped.

Of the remaining bits, the next k bits may correspond to a set index (not necessarily a cache line index). As a set comprises several lines, determining which cache line within a set is to be replaced may depend on the replacement policy that is implemented, as described above. If the number of cache lines in a set is one, then the cache may be said to be "direct mapped", which may be considered a particular kind of set associative cache, i.e. one-way set-associative. Thus, there may be no replacement policy in a direct mapped cache storage 130: the unique cache line in the set corresponding to the k bits may be replaced directly.

Such tags as described hitherto in the context of known systems, wherein each cache line is associated with a respective tag, may be referred to herein as "flat tags". As described, in known cache storage 130 and methods for operating them, a flat tag can be used to map part of a storage identifier, which as a whole represents a storage location e.g. in main storage 120, to a cache line associated with the flat tag. The remaining, least significant, part of the storage identifier may be provided by the index of the cache line or set, depending on the type of cache storage 130.

According to examples described herein, and in contrast to flat tags, a tag may be stored in the form of an individual tag portion which is individual to each cache line of a cache storage 130, and a shareable tag portion which is shareable between two or more cache lines, with pointer data associating the individual tag portions with the shareable tag portion.

Each cache line may be mapped to a different storage location external to the cache storage 130 (e.g. in main storage 120). The shareable tag portion may comprise a part of two or more storage identifiers that is common for two or more corresponding cache line tags. The individual tag portions may comprise respective remaining parts of the storage identifiers that are not common for said two or more cache lines. Pointer data associates the individual tag portions with the shareable tag portion to make a complete tag, i.e. corresponding to what would be the flat tag in the described known systems, for each cache line in the cache storage 130.

The identifier data stored by the shareable and individual tag portions corresponding to the storage identifier may be a translation of (part of) the storage identifier. For example, the identifier data stored in the shareable and individual tag portions may be different to the corresponding storage identifier (e.g. memory address) that represents a storage location in data storage. Translating from identifier data stored in a tag to memory address can be done in many different ways. Generally, a process may occur that takes the identifier data stored in the tag, and possibly other information, as input, and outputs the corresponding storage identifier (memory address).

In this way, the separate shareable and individual tag portions can be combined to form a tag that is able to function in the same way as a flat tag, for example when checking the cache storage 130 for given data, as part of a storage access instruction. However, in the present examples, the shareable tag portion may be stored in a single location, for example in the cache storage 130, with multiple individual tag portions pointing to said shareable tag portion to make complete tags. Therefore, storage area can be saved compared to storing said shareable tag portion in multiple locations; as part of a flat tag for each cache line in the cache storage 130; as in known systems. In the present examples, using a shareable to individual tag portion ratio of 1:N saves a storage area equivalent to ((N−1))/N shareable tag portions.

Separating flat tags into shareable and individual tag portions may also allow different formats of the shareable and individual tag portions (e.g. corresponding to different mappings between these portions and the original flat tag) to be implemented in a cache storage. Implementing a plurality of formats in the cache storage may allow more data to be moved into the shareable tag portion(s), thus saving more storage area.

The present methods and apparatuses of the examples described herein may be applied to any type of cache storage structure, for example a cache storage of any associativity (e.g. direct mapped, associative, set-associative, fully associative, or any other hypothetical kind). Examples described in the context of a particular cache storage type are for illustrative purposes, and are not intended to limit the functionality of the methods and apparatuses of the present disclosure to that particular cache storage type, unless otherwise specified.

Figure 2:
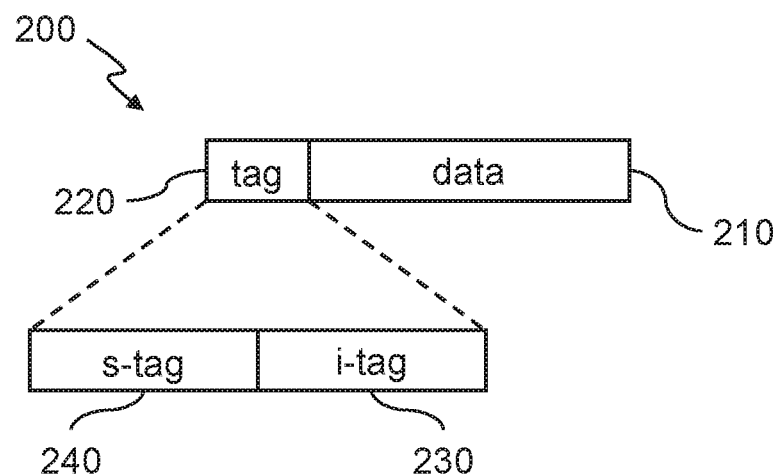
FIG. 2 shows a schematic representation of a cache line storable in cache storage according to an example.

FIG. 2 shows a schematic representation of a cache line 200 storable in cache storage according to an example. The cache line 200 comprises a data entry 210 representing data copied from a storage location, for example in main storage or other storage. In other examples, the data entry 210 may be empty or 'invalid' and available to store data corresponding to a storage location external to the cache storage. The cache line 200 is associated with a tag 220 which is in the form of an individual tag portion 230 and a shareable tag portion 240. The individual tag portion 230 is individual, or in other words exclusive, to the cache line 200 such that only that particular cache line 200 is associated with that individual tag portion 230. The shareable tag portion 240 may be shared between the cache line 200 and other cache lines in a cache storage, such that multiple cache lines 200 may be associated with the shareable tag portion 240.

As previously described, the individual tag portion 230 and shareable tag portion 240 can be combined, for example concatenated, to form the (complete) tag 220 for mapping the cache line 210 to the storage location corresponding to the data entry 210. For example, the tag 220 may comprise a part of a storage identifier (e.g. storage address) corresponding to said storage location, and the individual tag portion 230 and shareable tag portion 240 may comprise respective subparts, or portions, of the storage identifier.

The individual tag portion 230 may be stored with, or comprised as part of, the cache line 200, or may be stored separately to the cache line 200, for example in tag storage, or tag memory, which may be comprised in the cache storage or in a physically separate and discrete storage. In any case, each individual tag portion 230 may be considered to functionally be a part of a corresponding cache line 200.

In examples, there are multiple shareable tag portions 240 and individual tag portions 230 stored in the cache storage. A given shareable tag portion 240 may therefore be shared by multiple individual tag portions 230, or may be associated with a single individual tag portion 230.

Figure 3:
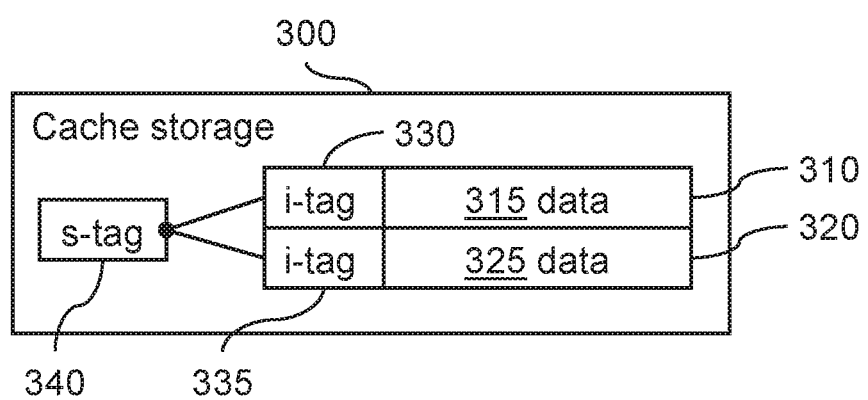
FIG. 3 shows a schematic representation of cache storage according to an example.

FIG. 3 shows a schematic representation of cache storage 300 according to an example. The cache storage 300 comprises a first cache line 310 and a second cache line 320, each configured to store respective data entries 315, 325. As described with reference to the example of FIG. 2, data entries 315, 325 may represent data copied from a storage location, for example in main storage or other storage, linked to the cache storage 300. Either or both data entries 315, 325 may alternatively be empty and available to be written to with data from a storage location.

The cache storage 300 is configured to store a tag in the form of: an individual tag portion 330, 335; a shareable tag portion 340; and pointer data (described in more detail below with reference to FIG. 4). The individual tag portions 330, 335 are individual to each of the first and second cache lines 310, 320 respectively. The shareable tag portion 340, however, is shareable between the first and second cache lines 310, 320. The pointer data associates the individual tag portions 330, 335 with the shareable tag portion 340. Therefore, as described, the shareable tag portion 340 that is common to the complete tags of the first and second cache lines 310, 320 may be stored in fewer storage locations of the cache storage 300, for example in only a single location, therefore saving storage area.

In some examples, the cache storage 300 may be configured to store the pointer data as part of the individual tag portions 330, 335.

Figure 4:
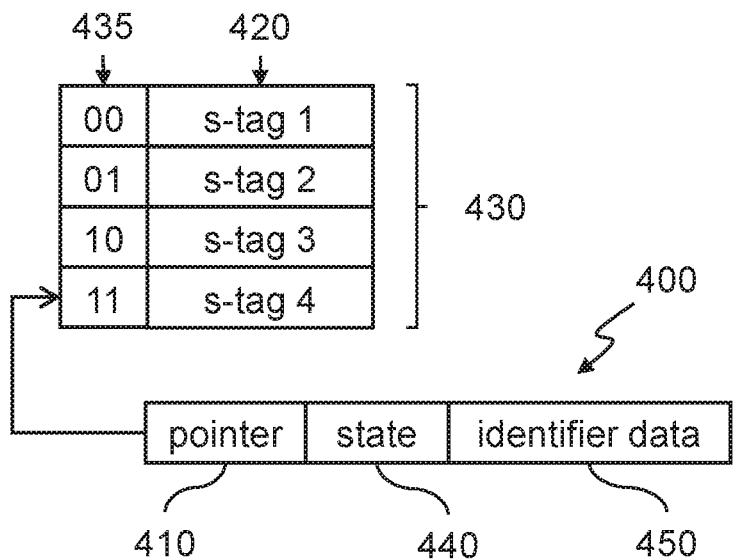
FIG. 4 shows a schematic representation of tag portions according to an example.

FIG. 4 shows a schematic representation of an individual tag portion 400 comprising pointer data 410, according to an example. The pointer data 410 may associate the individual tag portion 400 with one of a plurality of shareable tag portions 420 by corresponding to one of a plurality of shareable tag storage locations 430 that comprises the given shareable tag portion 420. For example, the plurality of shareable tag storage locations 430 may be locations of a shareable tag storage, with each shareable tag storage location 430 having an individual index 435 and storage area for a shareable tag portion 420. Therefore, the pointer data 410 of the individual tag portion 400 may associate said individual tag portion 400 with a specific shareable tag portion 420 by matching the index 435 of said shareable tag portion 420 in the shareable tag storage. The shareable tag storage may be comprised in the cache storage, or may be external to the cache storage. For example, the shareable tag storage may be stored in a separate and distinct storage to the individual tag portions 400 and/or associated cache lines, or in another cache level of a multi-level cache storage.

The individual tag portion 400 shown in FIG. 4 may correspond with one of the individual tag portions 330, 335 shown in FIG. 3, stored in the cache storage 300, in some examples. For example, the individual tag portion 400 may be associated with, or comprised as part of, an individual cache line in the cache storage 300, such as the cache line 310, as shown in FIG. 3.

In the example shown in FIG. 4, there are four shareable tag portions 420 stored in four respective shareable tag storage locations 430, each shareable tag storage location 430 having an index 435. Therefore, to associate the individual tag portion 400 with one of the four shareable tag portions 420, the pointer data 410 may comprise at least two bits. Two pointer data 410 bits can have one of four values [00, 01, 10, 11], each of which may correspond to a specific shareable tag storage location 430, for example via the index 435 of the specific shareable tag storage location 430. The individual tag portion 400 shown in FIG. 4 comprises pointer data having the value [11] and is therefore associated with the shareable tag portion 420 stored in the shareable tag storage location 430 having the index 435 value [11].

In other examples, there may be more or fewer shareable tag storage locations 430 and correspondingly more or fewer bits of pointer data 410. For example, in a simple case where there are only two shareable tag storage locations 430, each comprising a respective shareable tag portion 420 corresponding to part of a respective storage identifier, one bit of pointer data 410 may have one of two values [0, 1] to point to either shareable tag storage location 430. However, in other cases there may be more shareable tag storage locations 430 and so more bits of pointer data 410 to point to a particular shareable tag storage locations 430.

The individual tag portion 400 shown in FIG. 4 also comprises status data 440 and identifier data 450. The status data 440 may comprise data to signal whether the cache line associated with the individual tag portion 400 has data stored therein, (e.g. is in a 'valid' state) or not (e.g. is in a 'invalid' state). Such status data 440 may be called a 'flag' in some nomenclatures, and the individual tag portion 400 may comprise one or more flags, with each flag signaling a different information type.

The identifier data 450 may comprise part of a storage identifier (for example a storage address) representing a storage location in storage external to the cache storage. This part of the storage identifier comprised in the individual tag portion 400 may comprise the least significant bits of the (m-k) bits remaining of the m-bit storage identifier, where k bits correspond to a cache line index or set index of the cache storage, depending on the associativity of the cache storage, as previously described. This part of the storage identifier comprised in the individual tag portion 400 may be individual to the given cache line associated with, or comprising, the individual tag portion 400.

In some examples, one or more hash functions may be used to map from storage identifiers (e.g. storage addresses) to set indexes in the cache storage. In these examples, a transformation function may be used to take the k bits of the set index and the (m-k) bits of identifier data 450 stored in a tag, e.g. distributed between individual and shareable tag portions, to reconstruct the remaining k bits of the storage identifier. In some cases these k bits may not be reconstructed, and the tag is stored as m-bits. In any case, the methods and apparatuses of the present disclosure are not dependent on any particular hashing function or mapping between identifier data 450 stored in a tag in the cache storage and a storage identifier representing a storage location outside the cache storage.

As previously described, the identifier data 450 stored by a tag, e.g. the individual tag portion 400, corresponding to the storage identifier may be a translation of (part of) the storage identifier. For example, the identifier data 450 stored in the individual tag portion 400 may be different to the corresponding storage identifier (e.g. memory address) that represents a storage location in data storage. A translation process may be implemented that can take the identifier data 450 stored in the individual tag portion 400, and possibly other information, as input, and output the corresponding storage identifier.

Figure 5:
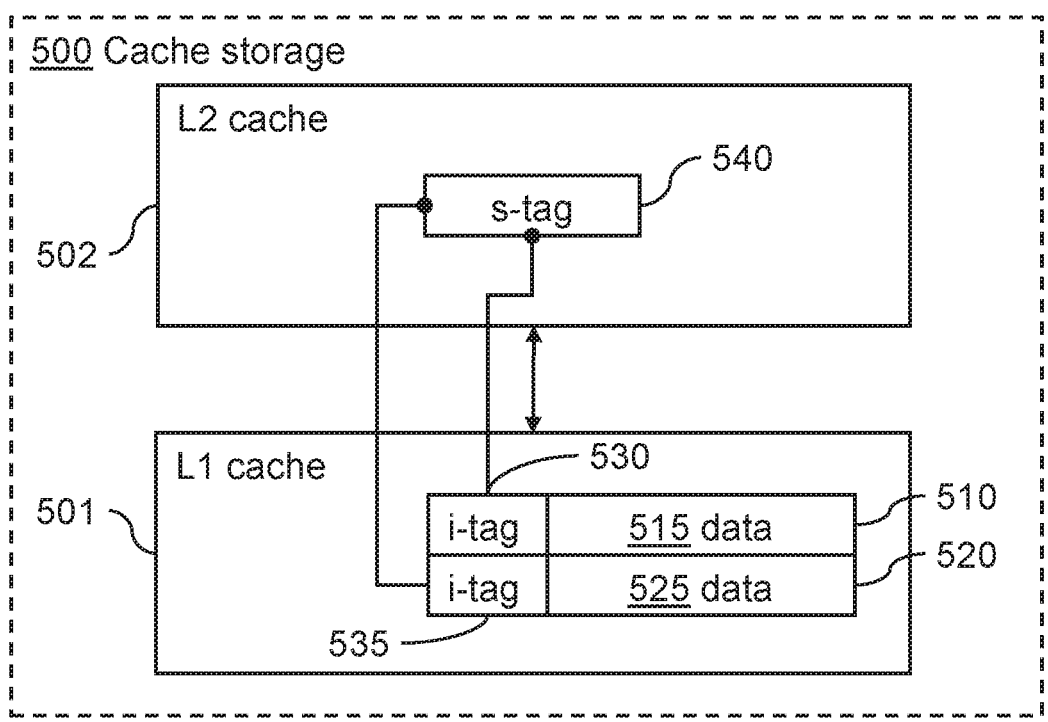
FIG. 5 shows a schematic representation of cache storage according to an example.

FIG. 5 shows a schematic representation of cache storage 500 according to an example. The cache storage 500 comprises a multi-level cache storage 500 including a first level cache 501 and a second level cache 502. One of the first level cache 501 and the second level cache 502 may be configured to store cache lines, e.g. first and second cache lines 510, 520, and the other of the first level cache 501 and the second level cache 520 may be configured to store the shareable tag portion 540. In examples, pointer data may be stored as part of respective individual tag portions 530, 535 of the cache lines 510, 520. The pointer data may therefore associate individual tag portions 530, 535 stored in one level of the multi-level cache 500 (e.g. L1 in FIG. 5) with the shareable tag portion stored in another level (e.g. L2 in FIG. 5). The shareable tag portion 540 may be stored in a shareable tag storage location, i.e. a location in a shareable tag storage. The shareable tag storage may be a part of one of the cache levels 501, 502 of the multi-level cache storage 500, for example an assigned or designated storage area in one of the cache levels 501, 502. The pointer data may point to the shareable tag storage location comprising the shareable tag portion 540 to associate the respective individual tag portion 530, 535 with the shareable tag portion 540.

In some examples, the shareable tag storage location comprising the shareable tag portion 540 may be pointed to by pointer data associated with individual tag portions 530, 535 stored in several different caches.

Figure 6A:
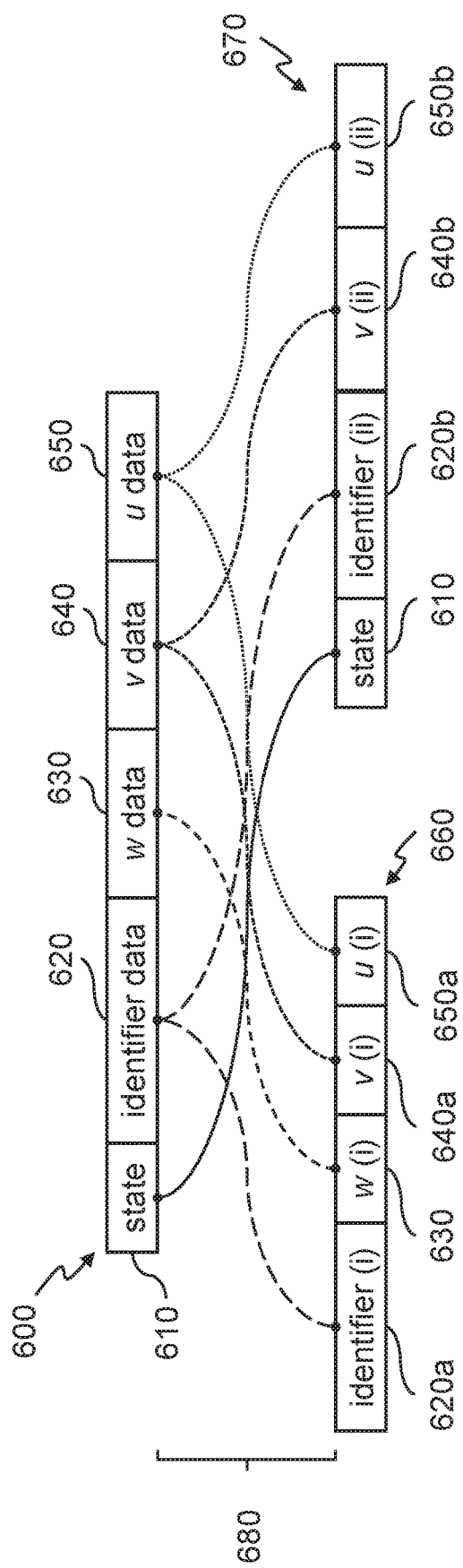
FIGS. 6a and 6b show schematic representations of mapping schemas for mapping data types of a tag to a shareable tag portion and an individual tag portion, according to respective examples.
Figure 6B:
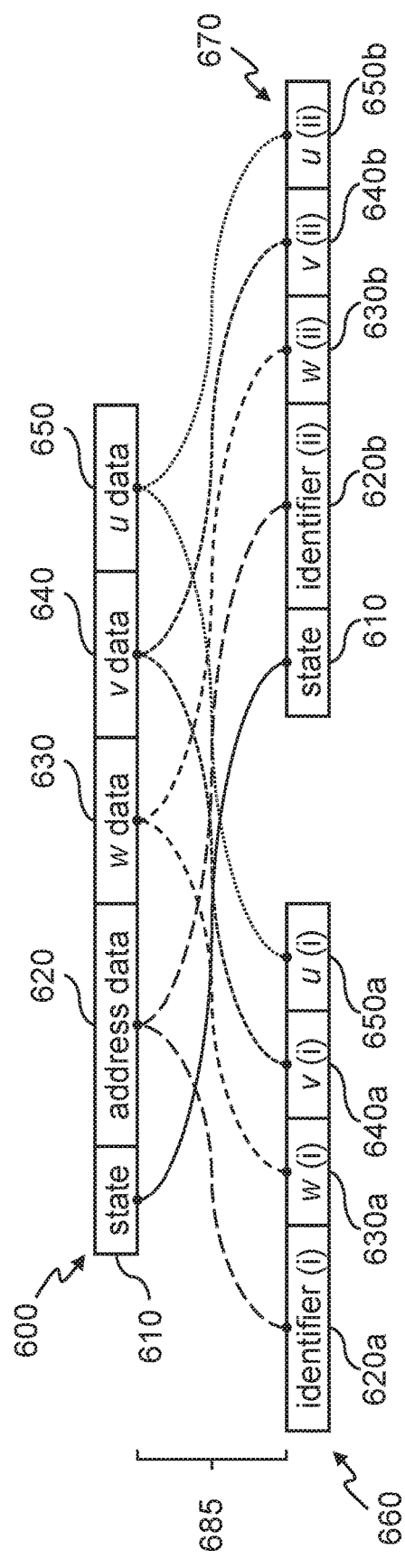

FIGS. 6a and 6b show a schematic representation of a tag 600, for example a flat tag as previously described in the context of known systems, storable in cache storage. The tag 600 comprises a plurality of data types 610, 620, 630, 640, 650 each of which may be a particular kind of data. A data type may determine what operations can be done on the corresponding data, the meaning of said data, and/or how said data is to be stored.

For example, the tag 600 shown in FIGS. 6a and 6b comprises status data 610 as one data type, and identifier data 620 as another data type. The status data 610 may signal a state that the tag 600, or a particular cache line associated with the tag 600, is in or an attribute that the cache line has. For example, as previously described, the status data 610 may comprise data to signal whether the cache line associated with the tag 600 is in a 'valid' state (i.e. has data stored therein), or is in a 'invalid' state (i.e. does not have data stored therein and so is available to be written to).

The identifier data 620 may comprise part of a storage identifier (for example a memory address) representing a storage location in storage external to the cache storage. A remaining part of the storage identifier may be comprised in an index of the cache line in the cache storage, as described. The identifier data 620 may comprise a translation of the storage identifier part, as described, wherein the identifier data 620 may be reverse translated to obtain the storage identifier part.

In some examples, the tag 600 comprises one data type.

FIG. 6a shows data types 610, 620, 630, 640, 650 of the tag 600 distributed between a shareable tag portion 660 and an individual tag portion 670. As described with reference to other figures, the individual tag portion 670 is individual to a particular cache line of cache storage, and the shareable tag portion may be shared between two or more cache lines of the cache storage. Pointer data, not shown in FIG. 6, associates the individual tag portion 670 with the shareable tag portion 660, for example by pointing to a shareable tag storage location comprising the shareable tag portion 660.

The identifier data 620 of the tag 600 is distributed between the shareable tag portion 660 and an individual tag portion 670 in the example of FIG. 6a. For example, the identifier data 620 is split into a first portion 620a and a second portion 620b, with the first portion 620a of identifier data 620 stored in the shareable tag portion 660, and the second portion 620b of identifier data 620 stored in the individual tag portion 670. In this way, multiple cache lines of the cache storage that have a (complete) tag comprising the first portion 620a of identifier data 620 may each be associated with a respective individual tag portion 670 that points to the shareable tag portion 660 comprising the first portion 620a of identifier data 620. Therefore, as described with reference to shareable tag portions generally, identifier data 620 that is common to the complete tags multiple cache lines may be stored in fewer storage locations of the cache storage, for example only once, in the shareable tag portion 660, therefore saving storage area in the cache storage.

Distributing one or more data types of the tag 600 between the shareable tag portion 660 and the individual tag portion 670 may allow tag data that is common to multiple storage access instructions, for example occurring in sequence, to be stored in the shareable tag portion 660 and be shared or re-used by multiple individual tag portions 670. For example, the identifier data 620 may be distributed between the first portion 620a stored in the shareable tag portion 660, and the second portion 620b stored in the individual tag portion 670, in a way such that the shareable tag portion 660 is more likely to be shared by other cache lines. For example, the identifier data 620 may be distributed between the first portion 620a and the second portion 620b such that the first portion 620a is common to as many cache lines as possible.

In other examples, the likelihood of the shareable tag portion 660 being re-used, or shared, may be increased by distributing data types that are likely to be more variable between cache lines to the individual tag portion only. For example, the status data 610 shown in FIG. 6a is distributed to the individual tag portion 670 and not to the shareable tag portion 660.

In some examples, as shown in FIG. 6a, the data types are mapped to the shareable tag portion 660 and the individual tag portion 670 using a mapping schema. The mapping schema distributes the different data types 610, 620, 630, 640, 650 of the tag 600 between the shareable tag portion 660 and the individual tag portion 670. A given data type may be mapped to the individual portion 670 only, the shareable portion 660 only, or distributed to both shareable and individual tag portions 660, 670 depending on the mapping schema used. The latter of these three mapping options may be implemented in many possible ways. Mapping schemas using any of three options may coexist. Generally, an n-bit data type can be distributed in 2n different ways between the shareable and individual tag portions 660, 670, however a practical set of mapping schemas may comprise a smaller subset of these potential ways.

In some examples a given data type is distributed to both the shareable tag portion 660 and the individual tag portion 670. For example, a part or portion of the data corresponding to the given data type may be stored as part of the shareable tag portion 660, and the remaining part or portion stored as part of the individual tag portion 670. This is the case for the identifier data 620 of the tag 600 in the example shown in FIG. 6a, as described above.

In some cases, one or more bits of the given data type that are most significant are distributed to the shareable tag portion 660. For example, with reference to FIG. 6a, the identifier data 620 may comprise a series, or 'string', of bits, with a most significant bit (alternatively termed the high-order bit) being a bit position in the series of bits having the greatest numerical value. Conversely, a least significant bit may be a bit position in the series of bits having the lowest numerical value. In conventional binary positional notation, the most significant bit may be termed the left-most bit. Therefore, in these cases, where the data (e.g. identifier data 620) of a given data type is split into first and second portions (620a, 620b) with the first portion (620a) stored in the shareable tag portion 660, and the second portion (620b) stored in the individual tag portion 670, the first portion (620a) may comprise bits of higher significance compared to the second portion (620b). In other words, the higher-order, or left-most, bits of the given data type are distributed to the shareable tag portion 660, with the remaining lower-order, or right-most, bits distributed to the individual tag portion 670.

In some examples, a specific data type is distributed only to the shareable tag portion 660. For example, all of the data in the tag 600 corresponding to the specific data type may be stored as part of the shareable tag portion 660, with no remaining part of the data corresponding to the specific data type being stored as part of the individual tag portion 670. This is the case for the w-coordinate data 630 of the tag 600 example shown in FIG. 6a, and described further below.

In some examples, data types 610, 620, 630, 640, 650 of the tag 600 are mapped to the shareable tag portion 660 and the individual tag portion 670 using a plurality of mapping schemas 680, 685. FIG. 6a shows a first mapping schema 680 where a given data type, w-coordinate data 630 in this example, is distributed only to the shareable tag portion 660.

FIG. 6b shows a second mapping schema 685 where said given data type, w-coordinate data 630 in this example, is distributed to both the shareable tag portion and the individual tag portion. The w-coordinate data 630 in the example of FIG. 6b is distributed as a first portion 630a and a second portion 630b thereof, with the first portion 630a stored in the shareable tag portion 660, and the second portion 630b stored in the individual tag portion 670.

Mapping data types 610, 620, 630, 640, 650 of the tag 600 to the shareable tag portion 660 and the individual tag portion 670 using different mapping schemas 680, 685 may give shareable tag portions 660 and individual tag portions 670 of different formats, with the formats corresponding to the mapping schema 680, 685 used. For example, a format of a shareable or individual tag portion 660, 670 may correspond to a designation of bits in the respective tag portion 660, 670 for each data type. For example, with reference to FIGS. 6a and 6b, the identifier data 620 in the tag 600 may comprise 44 bits. The first format of the individual tag portion 670, resulting from the first mapping schema 680, shown in FIG. 6a, may comprise 12 bits of the identifier data 620 in the second portion 620b, for example; leaving 32 bits remaining to be stored in the first portion 620a as part of the shareable tag portion 660. The second format of the individual tag portion 670, resulting from the second mapping schema 685, shown in FIG. 6b, may, however, comprise 32 bits of the identifier data 620 in the second portion 620b, for example; leaving 12 bits remaining to be stored in the first portion 620a as part of the shareable tag portion 660.

In some examples, the individual tag portion 670 comprises a format indicator which indicates the mapping schema 680, 685 used. For example, the format indicator may comprise a bit string of one or more bits, wherein a value of the bit string indicates the mapping schema 680, 685 used. The format indicator may be stored as part of the status data, or a portion thereof, stored in the individual tag portion 670. Alternatively, the format indicator may be a separate data type of the individual tag portion (not shown in FIGS. 6a, 6b).

The examples described herein with reference to FIGS. 6a and 6b may be implemented in cache storage. For example, the cache storage may store a tag 600 in the form of an individual tag portion 670, a shareable tag portion 660, and pointer data which associates the individual tag portion 670 with the shareable tag portion 660, in accordance with other examples described herein.

The cache storage may comprise a cache controller. The cache controller may, for example, implement the mapping schema(s) 680, 685 in distributing data types to the shareable and individual tag portions 660, 670.

The cache controller may, additionally or alternatively, receive storage access instructions, for example from a processor. The storage access instructions may be storage access requests, or cache queries, for example. The cache controller may be configured to check, or search, the cache storage in response to a storage access request. For example, the cache controller may be configured to check the cache storage for data requested by the storage access instruction. The cache controller may retrieve the requested data from the cache storage if: the storage access instruction contains a storage identifier which corresponds with a tag associated with a cache line of the cache storage; and the cache line is holding the data (which may be indicated by status data or a 'flag'). The storage identifier may represent a storage location in storage external to the cache storage (or another cache level in a multi-level cache storage) that is being checked. For example, the storage identifier may be a storage address comprising an address in a storage. As described, the tags may correspond to portions of respective storage identifiers, and may be searched, as part of the cache storage checking, by the cache controller to determine if there is a match between a tag stored in the cache storage and the particular storage identifier being checked for, or 'queried'.

For example, with reference to FIG. 6a, the cache controller may check the cache storage in response to a storage access instruction, for example received from a processor or other source, requesting data stored at a storage location of storage that is external, and coupled, to the cache storage. The storage access instruction may include a storage identifier representing the storage location in the storage. As described, the cache storage may therefore check the cache storage to determine if there is correlation between a tag stored in the cache storage and the storage identifier.

In accordance with the present example, the cache controller may query the shareable tag portion(s) 660 and individual tag portions 670 stored in the cache storage, and return a cache hit if a shareable tag portion 660 and individual tag portion 670 both correspond to the storage identifier contained in the storage access instruction.

The cache controller may search the shareable tag portions 660 and individual tag portions 670 sequentially, for example first searching the shareable tag portions 660 for correspondence with the storage identifier, and searching the individual tag portions 670 based on a cache hit with one or more of the shareable tag portions 660. The cache controller may then search the individual tag portions 670 that point to the one or more shareable tag portions 660, e.g. via pointer data, for example. By only searching the individual tag portions 670 that point to the one or more shareable tag portions 660 that give a cache hit, the cache controller may search only a subset of the individual tag portions 670 stored in the cache storage. This may allow the cache checking by the cache controller to be quicker and more efficient e.g. using less energy.

Alternatively, the cache controller may combine each of the shareable tag portions with the respective individual tag portions that point to it, to form complete tags, prior to searching the cache storage for a tag that corresponds with, e.g. at least partially matches, the storage identifier.

In other examples, the cache controller may check the shareable and individual tag portions in parallel. Each individual tag portion may be checked to see if its associated shareable tag portion was a "hit", e.g. corresponds with the storage identifier, or not. If both shareable and individual tag portions are a hit, this may correspond to a cache hit as previously described. Thus, the shareable and individual tag portions may be compared separately, and there may be two signals per flat tag that need to be true (a hit), one for each of the shareable and individual tag portions, for a full cache hit. These comparisons may be done in a single cache cycle.

Before checking the cache storage in response to a storage access instruction, the cache controller may be configured to interpret the shareable and individual tag portions 660, 670 stored in the cache storage to reconstruct the original (pre-mapped) data types. For example, the data portions corresponding to a given data type (e.g. first and second identifier data portions 620a, 620b) that have been mapped to the shareable and individual tag portions 660, 670 may be recombined into the original data type (e.g. identifier data 620) of the (complete) tag 600. This may be done for each data type, and each recombined data type may then be compared against the data types comprised in the storage access instruction.

Alternatively, the data types comprised in the storage access instruction may be mapped, e.g. based on the format indicator, to give post-mapped data type portions. These data type portions may then be compared directly with the data type portions comprised in the shareable and individual tag portions 660, 670. In this way, the mapping is done only once—for the identifier of the storage access instruction—and the result is compared directly against the "raw" bits stored in the shareable tag portions 660 and all of the individual tag portions 670, e.g. in a set of cache lines. The format indicator may be comprised as part of the storage access instruction. For example, when comparing data in the storage access instruction to the shareable and individual tag portions 660, 670, the format indicator of the storage access instruction may be compared to the format indicator of the individual tag portions 670, with a cache hit dependent on there being a match.

Reconstructing the original data types from the distributed data type portions of the shareable and individual tag portions 660, 670 may be used in a different case: when issuing storage access requests, e.g. to main storage, based on them. Such requests may be made one at a time and so can be relatively efficient.

In examples, a tag lookup mechanism, for checking the cache storage in response to a storage access instruction, may include mapping the datatypes of the storage access instruction into portions. This mapping may be based on a format indicator comprised in the storage access instruction, e.g. as described above with reference to mapping schemas 680 685 for mapping data types of a tag 600. Thus, the particular mapping of datatypes in the storage access instruction, based on the format indicator, may correspond to the mapping schema used for mapping data types of a tag 600 to shareable and individual tag portions 660, 670 based on the same, or corresponding, format indicator. The data types of the storage access instruction may therefore be mapped to "shareable" data type portions and "individual" data type portions corresponding to those portions that would result from mapping the same data types of a tag 600 to shareable and individual tag portions 660, 670, respectively, in the same way, i.e. by the same mapping schema 680, 685.

The tag lookup mechanism may include comparing the shareable data type portions of the storage access instruction to the shareable tag portions 660 stored in the cache storage. The individual data type portions of the storage access instruction may be compared to the individual tag portions 670 stored in the cache storage, for example in an appropriate cache set. These comparisons may be done in different ways, as described above, e.g. in parallel.

In examples, for each individual tag, a multiplexer may take the associated pointer data as a selector and results of shareable tag portion comparisons (e.g. the results of comparing the shareable data type portions of the storage access instruction to the shareable tag portions 660 described above) as inputs. The multiplexer may output whether the appropriate shareable tag portion comparison is a hit or not. If the result is a hit, and the individual tag portion comparison is also a hit, a (full) cache hit may occur. This entire process may be done in a single cache cycle.

In some examples, the cache controller is configured to, when checking the cache storage in response to a storage access instruction, selectively ignore a discrepancy with regard to a data type stored in the shareable tag portion 660, based on a format indicator of the individual tag portion 670. For example, on finding that the combined shareable tag portion 660 and the individual tag portion 670 of a cache line together correspond to, e.g. at least partially match, the storage identifier—except for the w-coordinate data 630 stored in the shareable tag portion 660—the cache controller may selectively ignore this discrepancy based on a value or state of the format indicator of the individual tag portion 670. In other words, certain data types stored in the shareable or individual tag portions 660, 670, may have different interpretations by the cache controller, with the interpretation taken by the cache controller being dependent on a format of the shareable and/or individual tag portions 660, 670. The format may be indicated by a format indicator, for example a bit string having multiple possible values, as previously described.

In examples, as previously described, the storage access instruction may comprise a format indicator which is compared to the format indicator of the individual tag portion 670. In order for a cache hit to occur, these format indicators may also need to match.

The cache controller may comprise one or more tag comparators for comparing the shareable and/or individual tag portions 660, 670 with a storage identifier. The data types that have a single interpretation may be directly input to the tag comparators, while those data types having multiple interpretations may be multiplexed, with format dependence, when input to the tag comparators. In some examples, the cache controller may be external to the cache storage and coupled thereto.

In certain examples, the cache storage storing the shareable and individual tag portions 660, 670 is a texture cache for a graphics processing system. The cache lines of the texture cache may comprise texture data representative of one or more texels in one or more texture spaces.

For example, a known graphics processing pipeline involves a texture mapping procedure in which a texture, which may typically be two- or three-dimensional, is applied or mapped onto the surface, or volume, of a shape or polygon, which is for example three dimensional, before being rendered by a computer graphics system. This generally allows more realistic or detailed images to be rendered. For example, detail of an object may be generated by applying a texture to a set of graphics primitives, such as polygons, representing the object, to give the object the appearance of the texture.

Texture elements, sometimes referred to as 'texture pixels' or 'texels', may represent features or characteristics of the texture, such as a color or luminance value.

The tag 600 shown in FIG. 6a comprises u-, v-, and w-data types 650, 640, 630 respectively. These data types may correspond to at least part of a first-dimensional (u) coordinate, second-dimensional (v) coordinate, and third-dimensional (w) coordinate of a texel in a texture space, respectively. In examples, texture data representative of texels from different textures may be stored in respective cache lines. Therefore, the storage identifier (e.g. storage address) data comprised as part of the shareable and/or individual tag portions 660, 670 of the cache lines may distinguish between texels of different textures having the same coordinates in their respective textures. For example, if texture data representative of a first texel at coordinates (u=0, v=0, w=0) in a first texture is stored in a first cache line, and texture data representative of a second texel at the same coordinates (0, 0, 0) but in a different second texture is stored in a second cache line, the u-, v-, and w-coordinate data 650, 640, 630 for each texel may be the same in the respective shareable and/or individual tag portions 660, 670 of the first and second cache lines, but the storage identifier data portions 620a, 620b would differ between the first and second cache lines.

In some examples, the first mapping schema 680 corresponds to the texture space having two dimensions. The second mapping schema 685 may correspond to the texture space having three (or more) dimensions. For example, when a two-dimensional texture is being processed by the graphics processing system, the first mapping schema may be used to distribute the w-coordinate data 630 of the tag 600 to the shareable tag portion 660 only. This may increase the likelihood of the shareable tag portion 660 being used, as the w-coordinate data 630 will be the same across a two-dimensional texture (e.g. representing a zero coordinate). Storing all of the w-coordinate data 630 of the tag 600 in the shareable tag portion 660 can also increase the available space in the individual tag portion 670 to store u- and v-coordinate data 650, 640.

In other examples, a three-dimensional texture may be processed by the graphics processing system, and so the second mapping schema may be used to distribute the w-coordinate data 630 of the tag 600 to both the shareable tag portion 660 and the individual tag portions 670.

As previously described, the individual tag portion 670 may comprise a format indicator which indicates the mapping schema 680, 685 used and therefore may indicate the dimensionality of the associated texture.

In some examples, interpretation of the shareable tag portion 660, for example when checking the cache storage in response to a storage access instruction, may be dependent on the format indicator. For example, on finding that the shareable tag portion 660 and the individual tag portion 670 of a cache line together correspond to a storage identifier contained in the storage access instruction—except for the w-coordinate data 630 stored in the shareable tag portion 660—this discrepancy may be ignored based on the format indicator of the individual tag portion 670 indicating that the data entry stored by the cache line corresponds to a two-dimensional texture, for example. However, this discrepancy may not be ignored based on the format indicator of the individual tag portion 670 indicating that the data entry stored by the cache line corresponds to a three-dimensional texture, for example. In this way, multiple individual tag portions 670, having different formats, e.g. corresponding to different texture dimensionalities, may point to the same shareable tag portion 660 and the resulting complete tag 600 combinations may be functional as part of the texture cache storage.

Multiple interpretations of particular data types may be extended to the individual tag portions 670. For example, any w-coordinate data 630b stored as part of an individual tag portion 670 may be ignored, e.g. when checking the cache storage in response to a storage access instruction, if the format indicator of said individual tag portion 670 has a value indicating that the data entry stored in the associated cache line relates to a two-dimensional texture, but not ignored if the format indicator has a value indicating that said data entry relates to a three-dimensional texture.

Using multiple mapping schemas to distribute data types of a tag between shareable and individual tag portions 660, 670 may allow multiple individual tag portions 670, having different formats corresponding to different texture dimensionalities, to point to the same shareable tag portion 660.

For example, in some examples, a third mapping schema may be used that distributes the w-coordinate data 630 of the tag 600 to the individual tag portion 670 only. In these examples, multiple individual tag portions 670, having different formats corresponding to different texture dimensionalities, may point to the same shareable tag portion 660 (which would thus not comprise any w-coordinate data 630 of the tag 600). For example, a shareable tag portion 660 without w-coordinate data 630 could function as a tag 600 in the cache storage when combined with individual tags 670 that either: comprise w-coordinate data 630b, which could be variable between individual tags 670 for a three-dimensional texture, or set to zero for a two-dimensional texture; or do not comprise w-coordinate data 630b, e.g. in the two-dimensional texture case.

In examples, as previously described, a shareable tag portion 660 may be shareable by individual tag portions 670 stored in different caches (e.g. separate associated caches as part of the cache storage). The shareable tag portions 660 may be considered to comprise raw bits having different interpretations. Thus, the different caches may implement different mapping schemas and/or different data types, and the individual tag portions 670 stored in the different caches may share the same shareable tag portion(s) 660 by interpreting the data stored in the shareable tag portion(s) 660 differently (e.g. depending on the particular cache and/or mapping schema).

Figure 7:
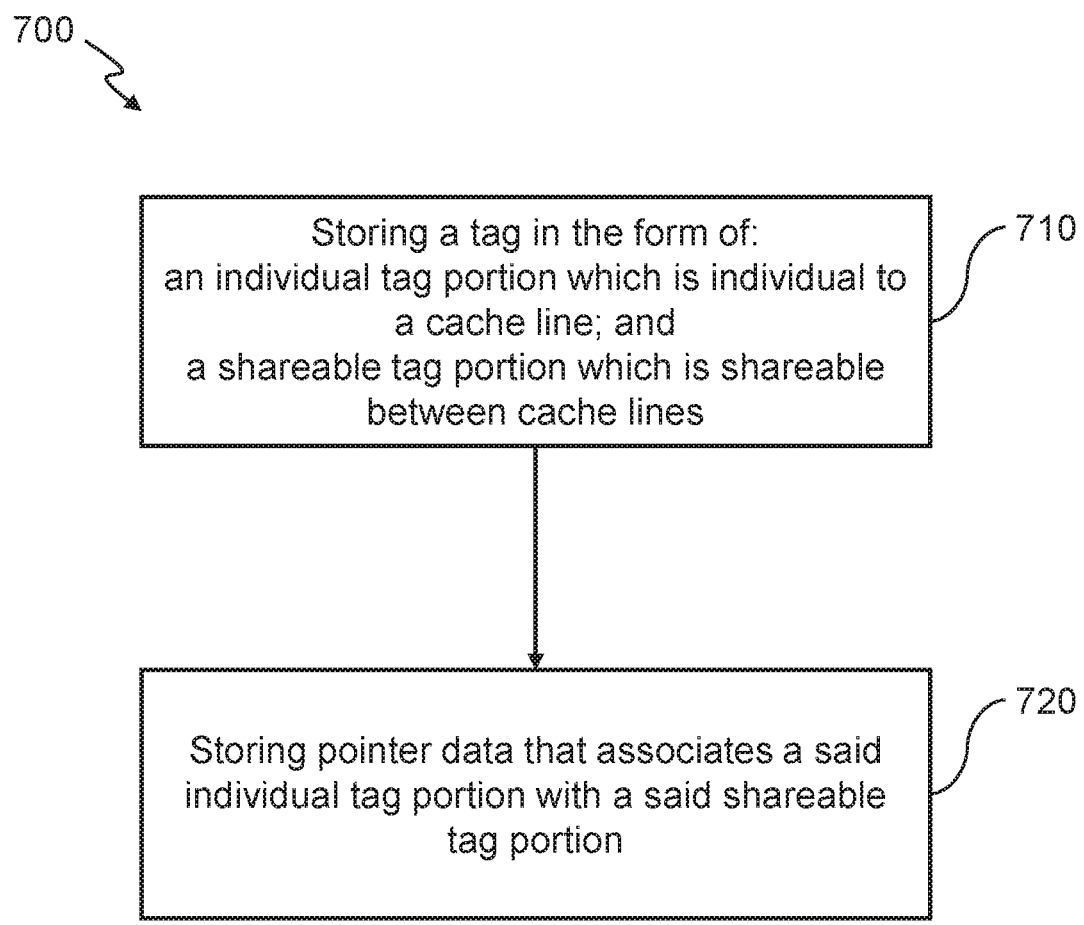
FIG. 7 shows a flow diagram illustrating a method of operating cache storage according to an example.

FIG. 7 shows a flow diagram illustrating a method 700 of operating cache storage comprising cache lines. The method 700 involves, at block 710, storing a tag in the cache storage, the tag being in the form of an individual tag portion which is individual to a cache line, and a shareable tag portion which is shareable between cache lines.

The method 700 further includes, at block 720, storing pointer data in the cache storage, wherein the pointer data associates a said individual tag portion with a said shareable tag portion. The pointer data may be stored as part of the tags, for example as part of individual tag portions.

The method 700 may be implemented using any of the cache storage examples described herein. For example, the cache storage may comprise a multi-level cache storage including a first level cache and a second level cache, as previously described with reference to FIG. 5. In this case, the method may include storing the cache lines in one of the first level cache and the second level cache, and storing the shareable tag portion in the other of the first level cache and the second level cache. The pointer data may therefore point from individual tag portions to the shareable tag portion across different levels of the cache storage.

The tag can comprise different data types. In some examples, the method 700 comprises mapping a plurality of said data types to the shareable and individual tag portions using at least one mapping schema which comprises distributing the different data types between the shareable tag portion and the individual tag portion. Mapping the data types to the shareable and individual tag portions may be done in accordance with the mapping schema examples described above, e.g. with reference to FIGS. 6a, 6b.

In further examples, the method 700 includes distributing a given data type to both the shareable tag portion and the individual tag portion. This may include distributing bits of the given data type that are most significant, or of higher order, to the shareable tag portion.

In other examples, the method 700 includes distributing a specific data type to the shareable tag portion only. For example, where data corresponding to said specific data type is consistent across a plurality of tags, e.g. by being extraneous and therefore zero in context of the data being stored in the cache storage such as texture data, said data corresponding to the specific data type may be stored in the shareable tag portion only. The individual tag portions may point to the shareable tag portion to incorporate the data that is consistent in the corresponding tags.

In some examples, the method 700 includes mapping said data types to the shareable and individual tag portions using a plurality of mapping schemas. These may include a first mapping schema, which comprises distributing a given data type to the shareable tag portion only, a second mapping schema, which comprises distributing said given data type to both the shareable tag portion and the individual tag portion, and a third mapping schema which comprises distributing said given data type to the individual tag portion only. The second mapping schema may comprise multiple mapping subschemas that distribute a given data type between the shareable and individual tag portions in different ways. As previously described, an n-bit data type may be distributed in 2n different ways between the shareable and individual tag portions. The mapping subschemas of the second mapping schema may therefore correspond respectively to a subset of the 2n different possible ways. Multiple mapping schemas corresponding to any of these three kinds may coexist in the cache storage.

The individual tag portion may include a format indicator which indicates the mapping schema used. The method 700 may thus include, when checking the cache storage in response to a storage access instruction, for example a cache read operation, selectively ignoring a discrepancy with regard to a specific data type stored in the shareable tag portion, based on the format indicator. In some examples, the method 700 may additionally or alternatively include selectively ignoring a discrepancy with regard to a specific data type stored in the individual tag portions, based on the format indicator. For example, a value of the format indicator may alter the interpretation of particular data types when being processed in response to a storage access instruction, for example by a cache controller. Under one interpretation, a particular data type may be ignored, for example, whereas under another interpretation, said data type may be taken into account when comparing the tags to a storage identifier included in the storage access instruction, as described above.

The cache storage may comprise a texture cache for a graphics processing system, e.g. used as part of a graphics pipeline. In such examples, the method 700 may include storing first and second texture data, representative of one or more texels in a texture space, as part of the cache lines. The texture space may have two or three dimensions. A data type corresponding to at least part of a third-dimensional coordinate of the texel in the texture space may be mapped to the shareable and individual tag portions depending on a value of the format indicator. For example, the first mapping schema described above may correspond to the texture space having two dimensions, which may be indicated by a first value of the format indicator. The second mapping schema may correspond to the texture space having three dimensions, which may be indicated by a second value of the format indicator.

In other words, cache lines in the same texture cache may store data entries representing data comprised in different textures of different dimensionalities (e.g. 2D and 3D). The individual tag portion corresponding to a respective cache line, e.g. stored as part of the cache line in the texture cache, may indicate the dimensionality of the texture that the cache line is storing data relating to. Such indication may be via the format indicator (which may e.g. comprise a bit having a value of 0 for a 2D texture, and 1 for a 3D texture). Individual tag portions having different format indicator values can include the same pointer data value, and thus point to the same shareable tag portion. This is allowed because, in some examples, particular data types in the shareable tag portion that relate to one format (e.g. 3D texture dimensionality) may be ignored when checking the texture cache for data corresponding to a different format (e.g. 2D texture data). When checking the texture cache for data corresponding to the same format (e.g. 3D texture data) the particular data types in the shareable tag portion may be compared, for example by a tag comparator.

As previously mentioned, the above embodiments are to be understood as illustrative examples. Further embodiments are envisaged. For example, different formats of cache line tags, which may or may not be related to graphics processing, may be used alongside each other in the same cache storage in the described ways and/or by implementing the described methods. It is envisaged that there could many formats coexisting within the same cache storage, with format indicators, as described, used to distinguish between them when managing and/or interpreting the individual and shareable tag portions.

Examples are also envisaged where the cache storage examples described herein may store data directly generated by a processor or one or more other parts of a data processing system, e.g. one or more components of an integrated circuit or "chip", alternatively or additionally to data being fetched from data storage, e.g. main storage.

In examples where the cache storage is positioned between a processor and data storage, e.g. main storage, there may be a cache hierarchy. For example there may be multiple cache levels of the cache storage hierarchically arranged between the processor and the data storage. Additionally or alternatively, the data storage may comprise a storage hierarchy, e.g. based on a cache hierarchy, with multiple storage levels arranged hierarchically.

In examples, storage locations "external to the cache storage" are mentioned. These storage locations may actually be locations in other caches comprised in the cache storage, e.g. in a multi-level or hierarchical cache storage, in certain cases. Thus, storage access instructions may be sent between caches within the cache storage in some examples.

Furthermore, a processor as described herein may comprise any type of circuit or circuitry capable of generating and submitting instructions, e.g. requests, to cache storage.

Examples are envisaged wherein a processor, for example a computer processing unit (CPU) core, coupled to the cache storage may submit storage access instructions containing (at least part of) a storage identifier that is mapped to shareable and individual tag portions by said processor. For example, this may be an alternative to the processor submitting a storage access request containing a storage identifier that is interpreted by the cache memory, e.g. via a cache controller, and split up to compare respective portions thereof to shareable and individual tag portions, as described in examples. Instead, the processor may submit the storage access request with the storage identifier already split into such shareable and individual portions. In this way, the shareable portion of the storage identifier may be directly compared to the shareable tag portion stored in the cache storage, and the individual identifier portion may be directly compared to the individual tag portions stored in the cache storage. Such comparisons may be performed by one or more tag comparators contained in the cache storage.

The comparisons may be done sequentially, as described in other examples. For example, the first comparison may be between the shareable identifier portion and the shareable tag portions. A cache miss at this stage may result in an overall cache miss. A cache hit (i.e. a match) for one or more particular shareable tag portions stored in the cache storage may lead to the individual tag portions stored in the cache storage being compared to the individual identifier portion. In examples, only the individual tag portions that point to the one or more particular shareable tag portions resulting in a cache hit in the first comparison are compared to the individual identifier portion in the second comparison. The second comparison may lead to a cache hit if the individual identifier portion matches an individual tag portion stored in the cache memory and the cache line associated with the individual tag portion comprises stored data (e.g. is valid). Otherwise, a cache miss may be returned if no match occurs.

Alternatively the comparisons may be done in parallel, as described in other examples. In this case, each individual and shareable tag portions may be compared in parallel, generating two comparison signals. Either of these signals may be true (a hit) or false (a miss) based on the comparisons. If both shareable and individual tag portions corresponding to a cache line are a hit, this may correspond to a cache hit as described.

Examples are also envisaged relating to allocation of cache lines in cache storage. For example, if a cache miss occurs on a tag lookup in the cache storage in response to a storage access instruction, a cache line may be allocated to store the data requested in the storage access instruction once it has been fetched e.g. from main storage. The individual tag portion associated with the allocated cache line may be updated accordingly. A shareable tag storage location may be allocated when there is no hit for any of the shareable tags portions comprised in respective shareable tag storage locations. The index of the shareable tag storage location (which may have been hit or otherwise allocated) may then be assigned to the individual tag portion by updating the pointer data to point to that index.

It should be noted that the Figures are merely schematic, and that, for example, in practice illustrated functional units in the same Figure may share significant hardware circuits, even though they may be shown schematically as separate units. It will also be appreciated that each of the stages, elements and units, etc., of the Figures may be implemented as desired and will accordingly include, for example, appropriate circuitry and/or processing logic, etc., for performing the associated operation and functions.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure.

What is claimed is:

1. Cache storage system comprising a cache storage having cache lines, each configured to store respective data entries representing data which can be retrieved from the cache storage when a storage access instruction contains a storage identifier which corresponds with a tag associated with a cache line,
   wherein the cache storage system is configured to store a first said tag in the form of:
      a first individual tag portion which is individual to a cache line;
      a first shareable tag portion which is shareable between cache lines; and
      first pointer data which associates the first individual tag portion with the first shareable tag portion,
   wherein, for the first said tag, the storage access instruction and the said corresponding tag each comprise a plurality of different data types, and the different data types are mapped to the first shareable tag portion and the first individual tag portion using a first mapping schema,
   wherein the cache storage system is configured to store a second said tag in the form of:
      a second individual tag portion which is individual to a cache line;
      a second shareable tag portion which is shareable between cache lines; and
      second pointer data which associates the second individual tag portion with the second shareable tag portion,
   wherein, for the second said tag, the storage access instruction and the said corresponding tag each comprise the plurality of different data types, and the different data types are mapped to the second shareable tag portion and the second individual tag portion using a second mapping schema, different to the first mapping schema, wherein the first mapping schema is used for data tags of data entries that are associated with a first number of dimensions and the second mapping schema is used for data tags of data entries that are associated with a second number of dimensions different from the first number of dimensions, and
   wherein the first mapping schema distributes the different data types between the first shareable tag portion and the first individual tag portion in a different way than the second mapping schema distributes the different data types between the second shareable tag portion and the second individual tag portion, to give shareable tag portions and individual tag portions of different formats, with the formats corresponding to the mapping schema used.

2. Cache storage system according to claim 1, wherein a given data type is distributed to both the first shareable tag portion and the first individual tag portion.

3. Cache storage system according to claim 2, wherein one or more bits of the given data type that are most significant are distributed to the first shareable tag portion.

4. Cache storage system according to claim 1, wherein a specific data type is distributed only to the first shareable tag portion.

5. Cache storage system according to claim 1, wherein:
   in the first mapping schema, a given data type is distributed only to the first shareable tag portion; and in the second mapping schema, said given data type is distributed to both the second shareable tag portion and the second individual tag portion.

6. Cache storage system according to claim 5, comprising a texture cache for a graphics processing system, wherein:
the cache lines comprise texture data representative of one or more texels in a texture space;
said given data type corresponds to at least part of a third-dimensional coordinate of the one or more texels in the texture space; and
the first mapping schema corresponds to the texture space having two dimensions.

7. Cache storage system according to claim 6, wherein the second mapping schema corresponds to the texture space having at least three dimensions.

8. Cache storage system according to claim 1, wherein the first individual tag portion comprises a first format indicator which indicates the format corresponding to the first mapping schema, and the second individual tag portion comprises a second format indicator which indicates the format corresponding to the second mapping schema.

9. Cache storage system according to claim 8, configured to, when checking the cache storage in response to a storage access instruction, selectively ignore a discrepancy with regard to a data type stored in the first shareable tag portion, based on the first format indicator.

10. Cache storage system according to claim 1, wherein the cache storage is configured to store the first pointer data as part of the first individual tag portion and to store the second pointer data as part of the second individual tag portion.

11. Cache storage system according to claim 1, comprising multi-level cache storage including a first level cache and a second level cache, wherein one of the first level cache and the second level cache is configured to store the cache lines, and the other of the first level cache and the second level cache is configured to store the first and second shareable tag portions.

12. A data processing system comprising a processor, a main storage, and a cache storage comprising cache lines, each cache line configured to store respective data entries representing data which can be retrieved from the cache storage when a storage access instruction contains a storage identifier which corresponds with a tag associated with a cache line,
wherein the cache storage is configured to store a first said tag in the form of:
a first individual tag portion which is individual to a cache line;
a first shareable tag portion which is shareable between cache lines; and
first pointer data which associates the first individual tag portion with the first shareable tag portion,
wherein, for the first said tag, the storage access instruction and the said corresponding tag each comprise a plurality of different data types, and the different data types are mapped to the first shareable tag portion and the first individual tag portion using a first mapping schema,
wherein the cache storage is configured to store a second said tag in the form of:
a second individual tag portion which is individual to a cache line;
a second shareable tag portion which is shareable between cache lines; and
second pointer data which associates the second individual tag portion with the second shareable tag portion,
wherein, for the second said tag, the storage access instruction and the said corresponding tag each comprise the plurality of different data types, and the different data types are mapped to the second shareable tag portion and the second individual tag portion using a second mapping schema, different to the first mapping schema, wherein the first mapping schema is used for data tags of data entries that are associated with a first number of dimensions and the second mapping schema is used for data tags of data entries that are associated with a second number of dimensions different from the first number of dimensions, and
wherein of the first mapping schema distributes the different data types between the first shareable tag portion and the first individual tag portion in a different way than the second mapping schema distributes the different data types between the second shareable tag portion and the second individual tag portion, to give shareable tag portions and individual tag portions of different formats, with the formats corresponding to the mapping schema used.

13. A method of operating a cache storage system comprising a cache storage having cache lines, each configured to store respective data entries representing data which can be retrieved from the cache storage when a storage access instruction contains a storage identifier which corresponds with a tag associated with a cache line, the method comprising:
storing a first said tag in the cache storage, the first said tag in the form of:
a first individual tag portion which is individual to a cache line; and
a first shareable tag portion which is shareable between cache lines; and
storing first pointer data in the cache storage, wherein the first pointer data associates the first individual tag portion with the first shareable tag portion,
wherein, for the first said tag, the storage access instruction and the said corresponding tag each comprise a plurality of different data types, and the method comprises mapping the different data types to the first shareable tag portion and the first individual tag portion using a first mapping schema,
the method comprising:
storing a second said tag in the cache storage, the second said tag in the form of:
a second individual tag portion which is individual to a cache line; and
a second shareable tag portion which is shareable between cache lines; and
storing second pointer data in the cache storage, wherein the second pointer data associates the second individual tag portion with the second shareable tag portion,
wherein, for the second said tag, the storage access instruction and the said corresponding tag each comprise the plurality of different data types, and the method comprises mapping the different data types to the second shareable tag portion and the second individual tag portion using a second mapping schema, different to the first mapping schema, wherein the first mapping schema is used for data tags of data entries that are associated with a first number of dimensions and the second mapping schema is used for data tags of data entries that are associated with a second number of dimensions different from the first number of dimensions, and wherein mapping using the first mapping schema comprises distributing the different data types between the first shareable tag portion and the second individual tag portion in a different way than the second mapping schema distributes the different data types between the second shareable tag portion and the second individual tag portion, to give shareable tag portions and individual tag portions of different formats, with the formats corresponding to the mapping schema used.

14. The method according to claim 13, comprising distributing a given data type to both the first shareable tag portion and the first individual tag portion.

15. The method according to claim 13, wherein:
the first mapping schema comprises distributing a given data type to the first shareable tag portion only; and
the second mapping schema comprises distributing said given data type to both the second shareable tag portion and the second individual tag portion.

16. The method according to claim 15, wherein the cache storage comprises a texture cache for a graphics processing system,
the method comprising storing first and second texture data, representative of one or more texels in a texture space, as part of cache lines,
wherein said given data type corresponds to at least part of a third-dimensional coordinate of the one or more texels in the texture space, and
wherein the first mapping schema corresponds to the texture space having two dimensions.

* * * * *